United States Patent

Stone, III et al.

[11] Patent Number: 5,909,102
[45] Date of Patent: Jun. 1, 1999

[54] BATTERY CONNECTION APPARATUS EMPLOYING FIXED LATCHING MEMBERS

[75] Inventors: Frank Henry Stone, III, Waukegan; James Henry Barber, Mundelein; Daniel Philip Groebe, Chicago, all of Ill.

[73] Assignee: Motorola, Inc., Schaumburg, Ill.

[21] Appl. No.: 09/010,101

[22] Filed: Jan. 21, 1998

[51] Int. Cl.[6] ................................................. H01M 10/46
[52] U.S. Cl. .......................................................... 320/114
[58] Field of Search ..................................... 320/107, 110, 320/112, 113, 114, FOR 101; D13/103, 107; 429/96, 99, 100

[56] References Cited

U.S. PATENT DOCUMENTS

| | | |
|---|---|---|
| D. 374,424 | 10/1996 | Nagele et al. . |
| D. 375,932 | 11/1996 | Nagele et al. . |
| D. 386,742 | 11/1997 | Amero, Jr. et al. . |
| 3,728,664 | 4/1973 | Hurst . |
| 3,969,796 | 7/1976 | Hodsdon et al. . |
| 4,213,078 | 7/1980 | Ferrell et al. . |
| 4,469,765 | 9/1984 | McCartney et al. . |
| 4,532,194 | 7/1985 | Liautaud et al. . |
| 4,653,115 | 3/1987 | Holcomb . |
| 4,871,629 | 10/1989 | Bunyea . |
| 4,904,549 | 2/1990 | Goodwin et al. . |
| 4,943,498 | 7/1990 | Cooper et al. . |
| 4,969,206 | 11/1990 | Desrochers . |
| 5,159,258 | 10/1992 | Kolvites et al. ........................ 320/113 |
| 5,225,760 | 7/1993 | Leiserson . |
| 5,251,105 | 10/1993 | Kobayashi et al. .................. 320/112 X |
| 5,251,329 | 10/1993 | Takagi et al. . |
| 5,308,716 | 5/1994 | Shababy et al. . |
| 5,317,247 | 5/1994 | Chong et al. . |
| 5,360,683 | 11/1994 | Broadfield . |
| 5,436,088 | 7/1995 | Castaneda et al. . |
| 5,457,376 | 10/1995 | Chong et al. . |
| 5,460,906 | 10/1995 | Leon et al. . |
| 5,506,488 | 4/1996 | Leiserson . |
| 5,525,888 | 6/1996 | Toya . |
| 5,535,437 | 7/1996 | Karl et al. . |
| 5,607,791 | 3/1997 | Garcia et al. . |
| 5,607,792 | 3/1997 | Garcia et al. . |
| 5,620,242 | 4/1997 | Leon et al. . |
| 5,646,501 | 7/1997 | Fishman et al. ........................ 320/112 |
| 5,656,876 | 8/1997 | Radley et al. . |

FOREIGN PATENT DOCUMENTS

| | | |
|---|---|---|
| 2302232 | 1/1997 | United Kingdom . |
| WO 92/10004 | 6/1992 | WIPO . |

*Primary Examiner*—Edward H. Tso
*Attorney, Agent, or Firm*—Mark D. Patrick

[57] ABSTRACT

A battery attachment apparatus (201) for attaching a battery (200) to an electronic device (100) includes a fixed latch arrangement and a contact arrangement. The fixed latch arrangement is carried on the electronic device (100) and the battery (200). The contact arrangement has a flat contact (220) carried on the battery (200) and a spring contact (310) carried on the electronic device (100). Upon mating the flat and spring contacts (220 and 310), the spring contact (310) deflects and urges the battery (200) into engagement with the fixed latch arrangement, thereby, securing attachment of the battery (200) and electrically connecting the battery (200) to the electronic device (100).

25 Claims, 7 Drawing Sheets

BATTERY CONNECTION APPARATUS EMPLOYING FIXED LATCHING MEMBERS

FIELD OF THE INVENTION

The present invention relates generally to batteries and, more particularly, to a battery attachment apparatus.

BACKGROUND OF THE INVENTION

Portable electronic devices, such as wireless communication devices, are powered by a battery. The battery includes a housing and one or more electrochemical cells disposed in the housing. Contacts carried on the housing of the battery are electrically connected to the cells. The electronic device has contacts adapted to mate with the battery contacts and deliver power from the cells to circuitry of the electronic device. A battery attachment apparatus ensures mating of the contacts of the battery and the electronic device. One such battery attachment apparatus is shown and described in U.S. patent application Ser. No. 08/710,912 by Paulick entitled "Contact Arrangement," filed on Sep. 24, 1996, and assigned to Motorola, Inc. The device includes a recess for receiving a battery. Springs of the recess enable a good connection between battery and device contact arrangements. A battery cover is adapted to retain the battery within the recess.

In arrangements employing battery covers, it is known to provide a gap between the battery pack received in the recess and the underside of the attached battery cover to facilitate removal and attachment of the battery cover. This gap, however, provides an opportunity for the battery to shift in the recess when the battery cover is attached and, thereby, become electrically disconnected from the device.

Therefore, what is needed is an improved battery attachment apparatus that secures a battery to an electronic device without relying on a battery cover.

DETAILED DESCRIPTION OF THE PREFERRED EMBODIMENTS

A battery attachment apparatus includes a fixed latch arrangement and a contact arrangement to connect a battery to an electronic device. The fixed latch arrangement is carried on the electronic device and the battery. The contact arrangement has a flat contact carried on the battery and a spring contact carried on the electronic device. Upon mating the flat and spring contacts, the spring contact deflects and urges the battery into engagement with the fixed latch arrangement, thereby, securing attachment of the battery. By equipping the battery and the electronic device with the fixed latch arrangement and employing the spring contact, the battery attachment apparatus secures and electrically connects the battery to the electronic device without the use of a battery cover.

Figure 1:
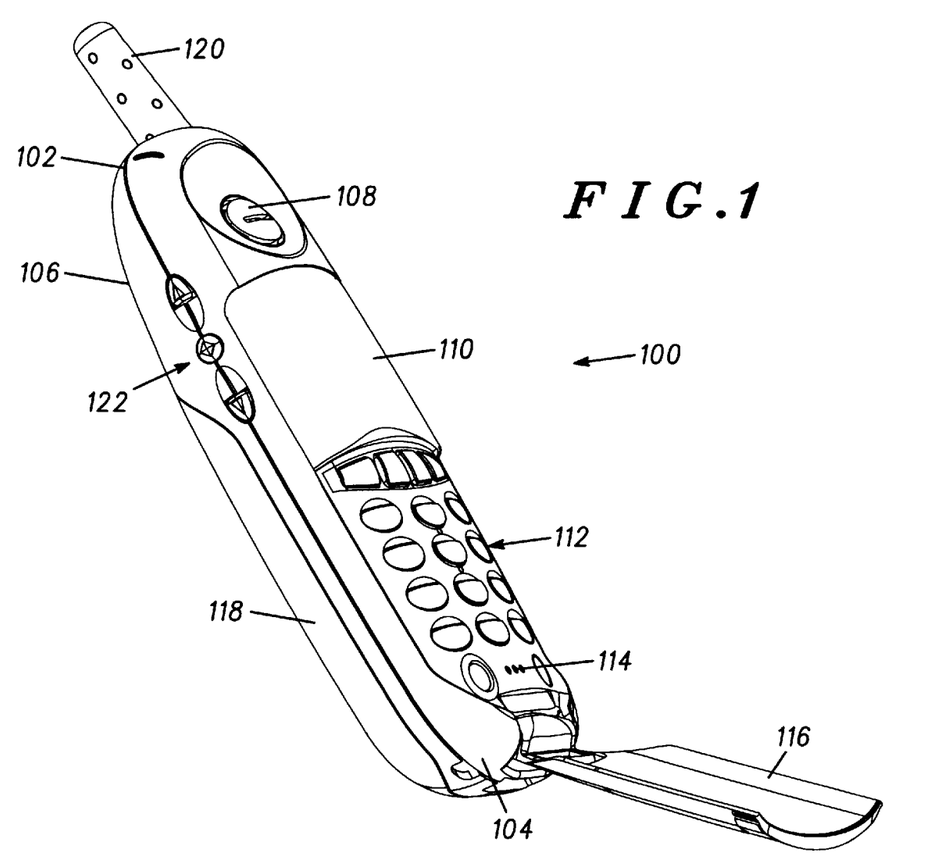
FIG. 1 is a front, left side, and bottom perspective view of an electronic device having a battery attachment apparatus.

An electronic device 100, which is shown in FIG. 1 to be a wireless communication device such as a radiotelephone, has a housing 102 that includes top and bottom housing portions 104 and 106. The top housing portion 104 includes an earpiece 108 for emitting audible sounds, a display area 110 for viewing information, a keypad 112 for entering or accessing information, a microphone 114 for receiving audible sounds, and a keypad cover 116. The keypad cover 116 is rotatable between the opened position shown in FIG. 1 and a closed position in which the keypad cover 116 covers the keypad 112 and microphone 114 and extends co-planarly with the display area 110. A button arrangement 122 for executing functions of the electronic device 100, such as earpiece volume adjustment, is carried on a side of the housing 102 where the top and bottom housing portions 104 and 106 meet. The bottom housing portion 106 has an antenna 120 for receiving and emitting signals to effectuate voice and data communications between the electronic device 100 and a remote device, such as another radiotelephone, a base station, or the like. A detachable battery cover 118 attached to the bottom housing portion 106 covers a battery 200 of FIGS. 2 and 3 and a recess 230 of the bottom housing portion 106.

The battery 200 is attached to the bottom housing portion 106 by a battery attachment apparatus 201 formed on the battery 200 and the recess 230. The battery attachment apparatus 201 has a fixed latch arrangement and a contact arrangement. When attached via the battery attachment apparatus 201, the battery 200 is secured in the recess 230, and provides power, to the electronic device 100.

One portion of the battery attachment apparatus 201 is formed of the battery 200. The battery 200 has a housing 202 defined by longitudinal and transverse axes 204 and 205. Top and bottom face surfaces 206 and 207 of housing 202 extend longitudinally between orthogonal front and rear ends 208 and 209 thereof. Left and right side surfaces 210 and 211 of housing 202 orthogonally interconnect top and bottom face surfaces 206 and 207 and front and rear ends 208 and 209. Housing 202 is molded from a polycarbonate blend or other suitable material into matable portions that, when assembled, form a substantially rectangular solid form having an approximate length of 57 mm, an approximate width of 37 mm, and an approximate height of 10 mm.

Housing 202 of the battery 200 employs notches 214, 215 and 300 of the fixed latch arrangement and flat contacts 218, 219, 220, 221, and 222 of the contact arrangement. Notches 214 and 215 are formed in front end 208 of housing 202 at respective left and right edges of front end 208, where they intersect left and right side surfaces 210 and 211, respectively. In the illustrated embodiment, notches 214 and 215, which employ a generally rectangular opening that extends longitudinally in a plane parallel to transverse axis 205 of housing 202 and is positioned approximately 2 mm up from a bottom edge of front end 208, are dimensioned to have a length of approximately 7 mm, a width of approximately 2 mm, and a depth of approximately 2 mm.

Figure 3:
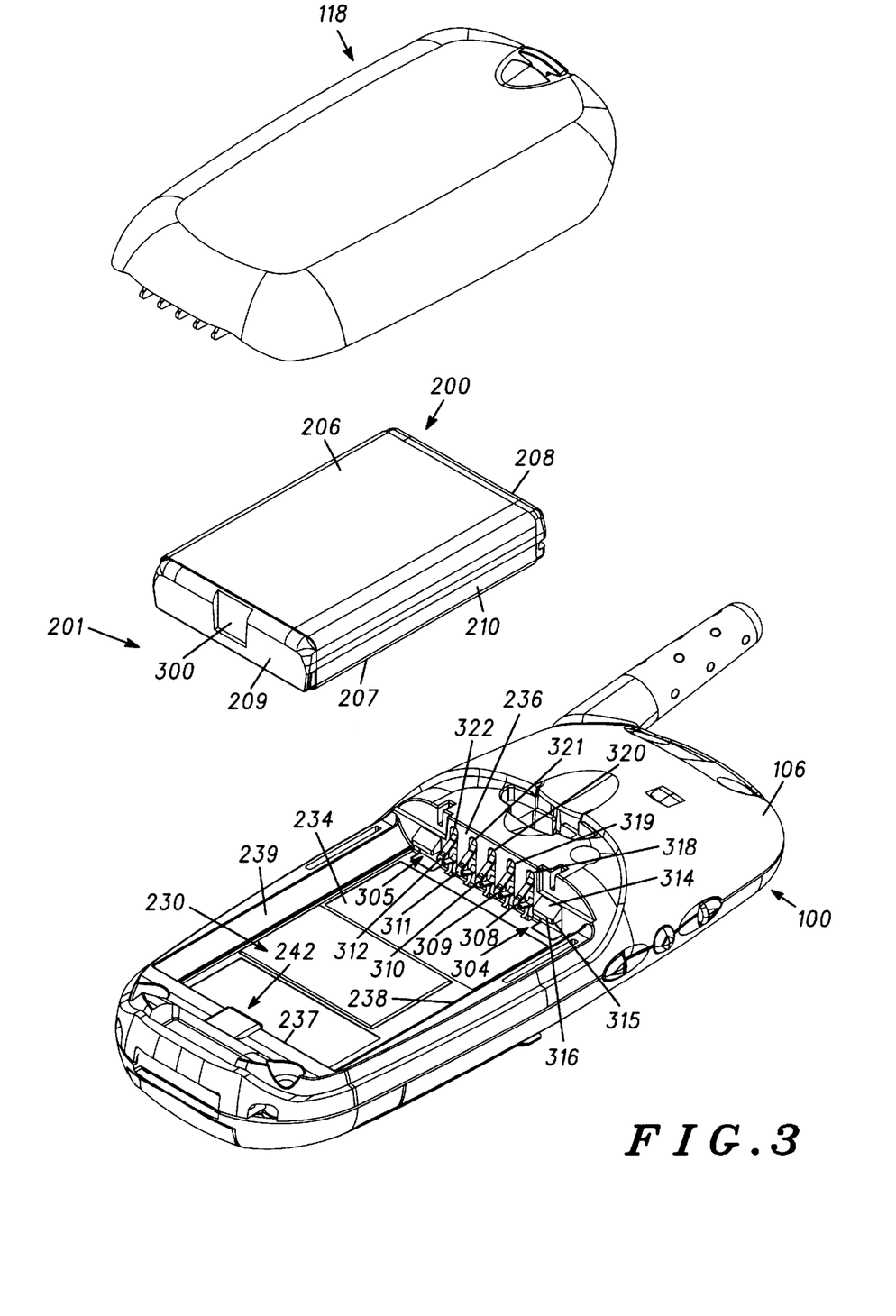
FIG. 3 is a rear, left side, and top perspective view of the electronic device of FIG. 1 showing the battery cover and the battery exploded therefrom.

Notch 300 of FIG. 3 is formed in a central location of rear end 209 of housing 202 at a top edge of rear end 209, where it intersects top face surface 206. In the illustrated embodiment, notch 300, which employs a generally square opening that is located approximately 2 mm up from a bottom edge of rear end 209 and approximately 15 mm inward from either the right or left edge of rear end 209, is dimensioned to have a length of approximately 7 mm, a width of approximately 8 mm, and a depth of approximately 1 mm.

Figure 7:
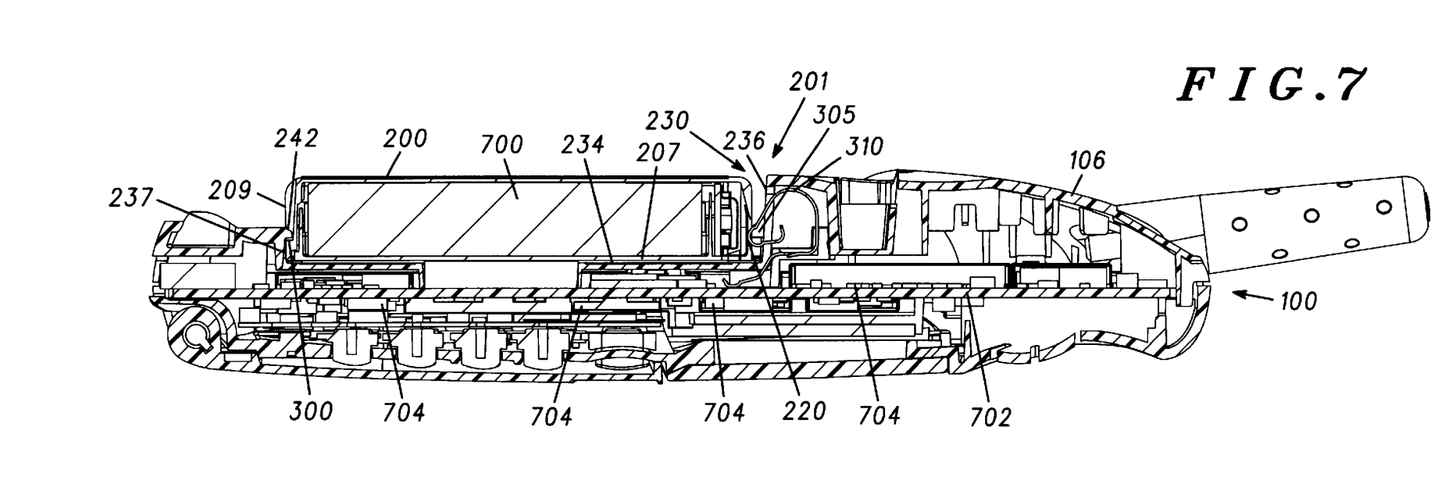
FIG. 7 is a first cross-sectional view of the electronic device of FIG. 6 taken across section lines 7—7 in FIG. 6.

The flat contacts 218–222 are carried in openings 224, 225, 226, 227, and 228, respectively, formed in the lower half of front end 208 between notches 214 and 215. The flat contacts 218–222 are slightly recessed in openings 224–227 and folded at bottom edge of front end 208 to extend along bottom face surface 207. In the illustrated embodiment, the flat contacts 218–222 are stamped from a thin sheet of nickel or other suitable material, bent into an "L"-shape, electrically connected to one or more electrochemical cells 700 of battery 200 as shown in FIG. 7, and assembled in housing 202 of FIG. 2 to face out openings 224–227.

The other portion of the battery attachment apparatus 201 is formed of the recess 230 of the bottom housing portion 106. The recess 230 is defined by longitudinal and transverse axes 232 and 233. Base surface 234 of the recess 230 extends longitudinally between orthogonal front and rear endwalls 236 and 237 thereof. Left and right sidewalls 238 and 239 of the recess 230 curve outward from the recess 230 and extend between front and rear endwalls 236 and 237. The recess 230, as well as the remainder of the bottom housing portion 106, is molded from a polycarbonate blend or other suitable material and has an approximate length of 60 mm, an approximate width of 43 mm, and an approximate depth of 3 mm at rear endwall 237 and 11 mm at front endwall 236.

The recess 230 employs catches 242, 304 and 305 of the fixed latch arrangement and spring contacts 308, 309, 310, 311, and 312 of the contact arrangement. Catch 242 is centrally carried on rear endwall 237 of the recess 230 at a top edge thereof. Catch 242 is defined by a slanted top surface 244 and a planar bottom surface 245 that extend between rear endwall 237 and a front surface 246 of catch 242. Front surface 246 is oriented in a plane parallel to transverse axis 233. In the illustrated embodiment, catch 242 is located approximately 3 mm up from base surface 234 and approximately 18 mm inward from either left or right sidewall 238 and 239, and is dimensioned to have a length of approximately 1 mm, a width of approximately 7 mm, and a thickness sloping from approximately 1.5 mm at rear endwall 237 to approximately 0.5 mm at front surface 245.

Catches 304 and 305 are carried on front endwall 236 of the recess 230 proximate to respective left and right edges of front endwall 236 and left and right sidewalls 238 and 239, respectively. Each one of catches 304 and 305 is defined by a slanted top surface 314 and a planar bottom surface 315 that extend between front endwall 236 and a front surface 316 of catches 304 and 305. Front surface 316 is oriented in a plane parallel to transverse axis 233. In the illustrated embodiment, catches 304 and 305 are located approximately 3 mm up from base surface 234 and approximately 5 mm inward from left and right sidewalls 238 and 239, respectively, and each is dimensioned to have a length of approximately 2 mm, a width of approximately 5 mm, and a thickness sloping from approximately 2 mm at front endwall 236 to approximately 1 mm at front surface 316.

Figure 4:
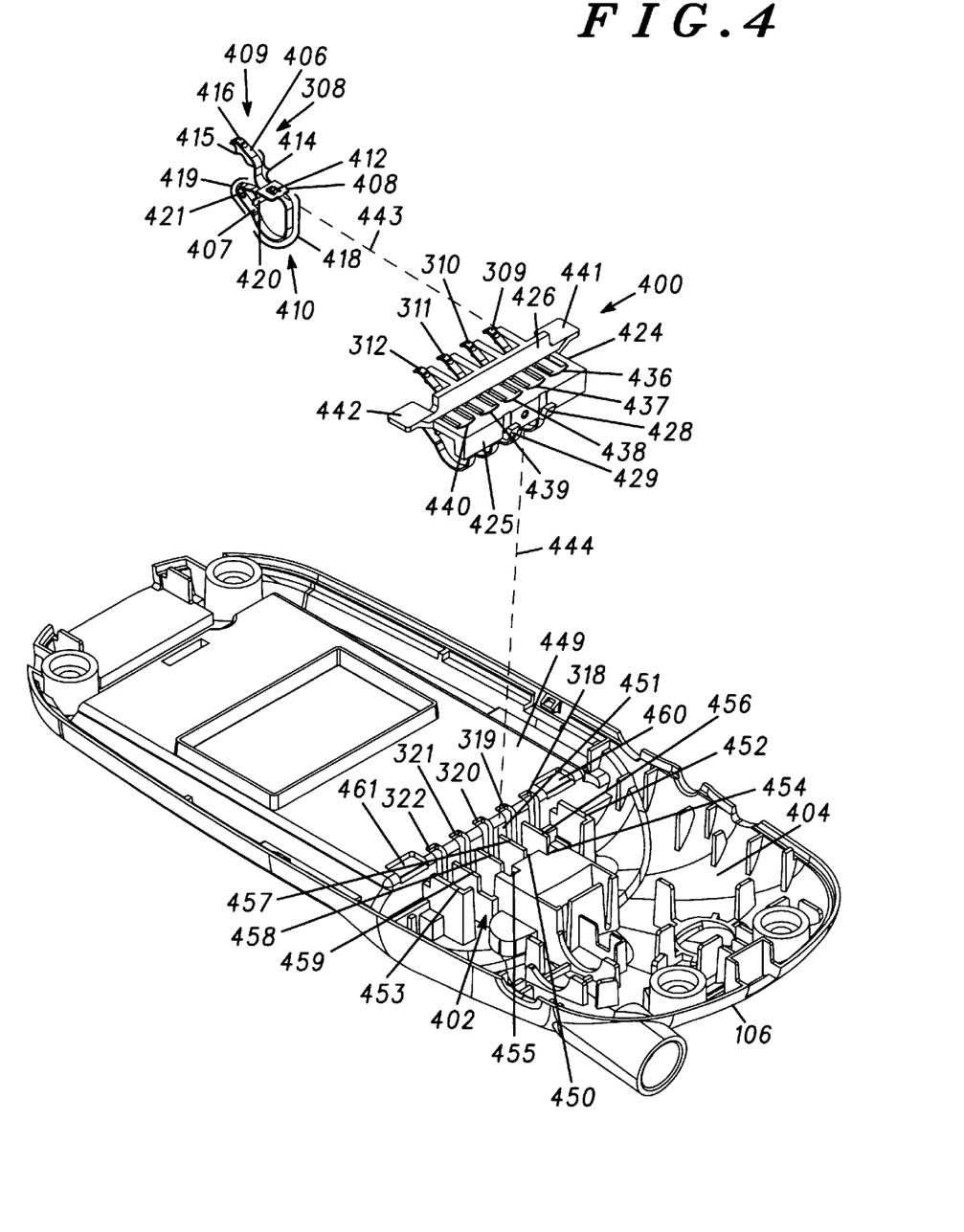
FIG. 4 is a perspective view of an internal surface of a rear housing portion of the electronic device of FIG. 1 showing, in a front top perspective, a contact block of the battery attachment apparatus exploded from the rear housing portion and a contact exploded from the contact block.

The spring contacts 308–312 are carried in, and protrude from, openings 318, 319, 320, 321, and 322, respectively, formed in front endwall 236 and base surface 234 between catches 304 and 305. As depicted in FIG. 4, spring contact 308, which is exemplary of each one of the spring contacts 308–312, is assembled to a contact block 400, which is further assembled to a receptacle 402 of the bottom housing portion 106.

Spring contact 308 has front and back surfaces 406 and 407 integrally formed into a central body 408, a lead arm 409 extending from one end of body 408, and a coiled, spring arm 410 extending from the other end of body 408 opposite the lead arm 409. A locking tooth 412 extends from a center of body 408. The lead arm 409 includes slanting segments 414 and 415. Segment 414 extends substantially perpendicular from body 408. Segment 415 extends slightly less than perpendicular from segment 414 and away from body 408. A crown 416 is formed on front surface 406 at a distal end of segment 415. The lead arm 409 is deflectable to position segment 415 in a plane substantially parallel to body 408. The spring arm 410 includes a substantially curved, "J"-shaped segment 418, which extends from body 408, and a substantially folded, "<"-shaped segment 419, which extends from segment 418 and terminates in a stop 420. A crown 421 is formed about an elbow of segment 419. The spring arm 410 is deflectable to move the elbow of segment 419 towards body 408. In the illustrated embodiment, spring contact 308 is stamped from a thin sheet of beryllium copper or other suitable material and bent into the above-described configuration so that the lead and spring arms 409 and 410 have spring constants of approximately 3300 N/m and approximately 2500 N/m, respectively, or other suitable values.

Figure 5:
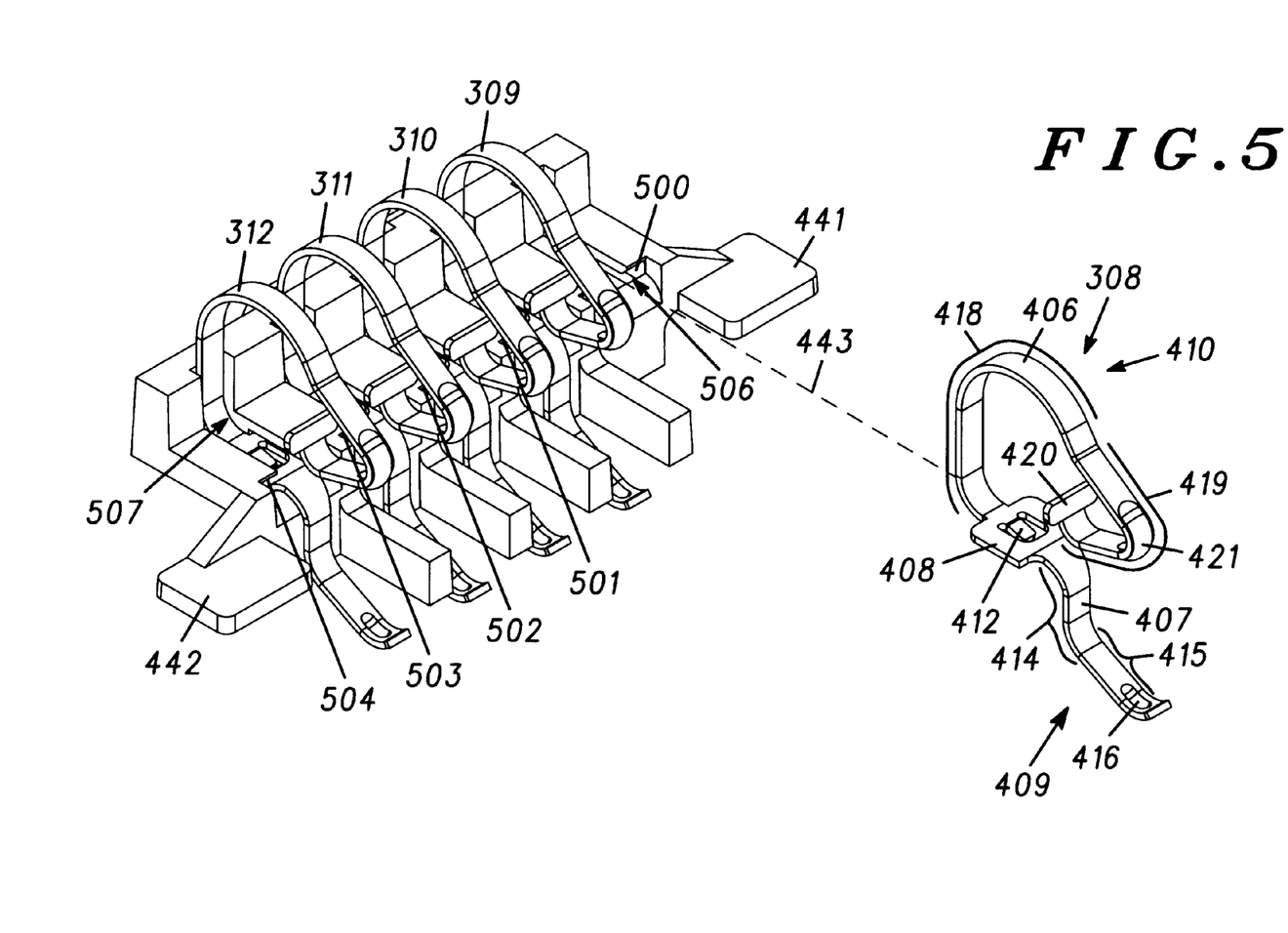
FIG. 5 is a rear, bottom perspective view of the contact block and the contact exploded therefrom of FIG. 4.

The contact block 400 is integrally formed of a central body 424, a front endwall 425 extending perpendicularly downward from one end of body 424, and a rear endwall 426 extending perpendicularly upward from the other end of body 424. Front endwall 425 has centrally located locking prongs 428 and 429 carried thereon. Body 424 and a back surface of front endwall 425 houses contact sockets 436, 437, 438, 439, and 440 accessible via openings 500, 501, 502, 503, and 504 formed in rear endwall 426, as shown in FIG. 5. Each of the contact sockets 436–440 has a pocket 506 bisected by a channel 507. Flanges 441 and 442 extend from respective left and right side edges of rear endwall 426. In the illustrated embodiment, the contact block 400 is molded from a polycarbonate blend or other suitable material.

Referring to FIGS. 4 and 5, spring contact 308 is assembled to contact socket 436 of the contact block 400 by aligning front surface 406 at segment 418 with channel 507 and edges of body 408 with pocket 506, and moving spring contact 308 toward the contact block 400 along a horizontal path depicted by broken line 443 until body 408 is received into pocket 506 and front surface 406 at segment 418 resides in channel 507 at back surface of front endwall 425. Once assembled, spring contact 308 is retained in contact socket 436 and prevented from moving away from the contact block 400 by locking tooth 412.

Figure 2:
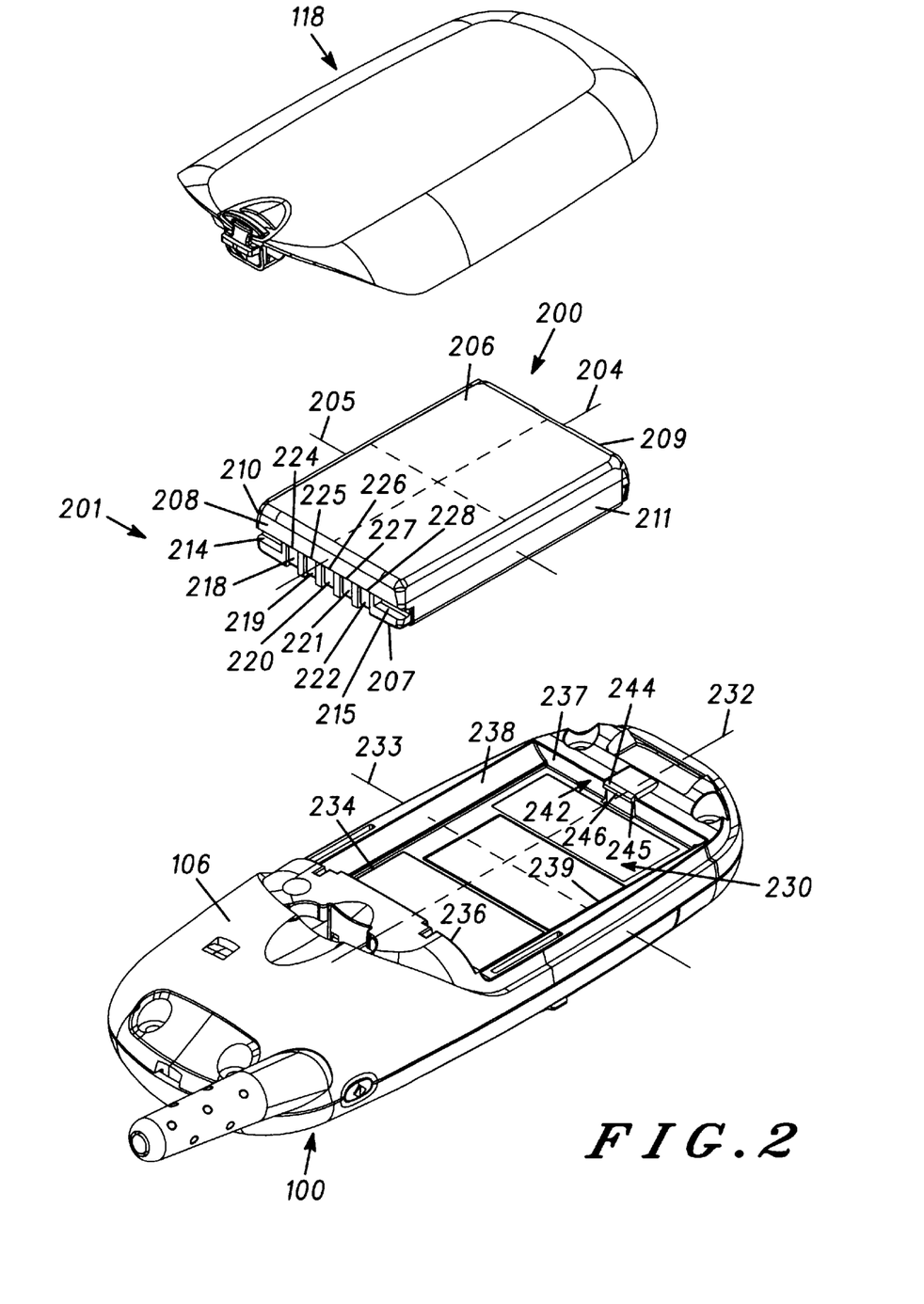
FIG. 2 is a rear, left side, and bottom perspective view of the electronic device of FIG. 1 showing a battery cover and a battery exploded therefrom, the electronic device and battery collectively employing the battery attachment apparatus.

The receptacle 402 is integrally formed on an internal surface 404 of the bottom housing portion 106 adjacent to a ledge surface 449 of the bottom housing portion 106. The receptacle 402 is bounded by a front endwall 450, a rear endwall 451, and sidewalls 452 and 453 extending perpendicularly from rear endwall 451. Front endwall 450 employs retention slots 454 and 455. Rear endwall 451 opposes front endwall 236 of FIGS. 2 and 3 of the recess 230 and contains openings 318–322 formed therein. Dividers 456, 457, 458, and 459 of FIG. 4 extend perpendicularly from rear endwall 451 to front endwall 450 and form pockets between openings 318 and 319, openings 319 and 320, openings 320 and 321, and openings 321 and 322, respectively. Internal ledge surface 449, which opposes base surface 234 of the recess 230 of FIGS. 2 and 3, is joined to rear endwall 451 of FIG. 4 at a top edge thereof. Along the top edge, ledge surface 449 is defined by the openings 318–322 and throughslots 460 and 461 positioned on either side thereof.

The contact block 400 is assembled to the receptacle 402 by, first, positioning the contact block 400 such that spring arm 410 of the spring contacts 308–312 is aligned with the pockets formed by sidewall 452 and divider 456, dividers 456 and 457, dividers 457 and 458, dividers 458 and 459, and divider 459 and sidewall 453, respectively. Following alignment, the contact block 400 is moved toward the receptacle 402 along a vertical path depicted by broken line 444. As the contact block 400 enters the receptacle 402, segment 419 of the spring contacts 308–312 slightly deflect toward the contact block 400 upon abutting ledge surface 449 at openings 318–322, respectively, and locking prongs 428 and 429 slightly deflect toward the contact block 400 upon entering retention slots 454 and 455, respectively. Assembly is complete when locking prongs 428 and 429 are fully extended inside respective ones of retention slots 454 and 455 and flanges 441 and 442 are received in respective ones of throughslots 460 and 461. Locking prongs 428 and 429 retain the contact block 400 in the receptacle 402, and flanges 441 and 442 as well as the captivation of body 424 and front endwall 425 between sidewalls 452 and 453 prevent rotation of the contact block 400 in the receptacle 402. Once assembled, the spring contacts 308–312 protrude from respective ones of openings 318–322 in a fully-extended, rest position, as shown in FIG. 3. In the fully-extended, rest position of the illustrated embodiment, the spring contacts 308–312 extend a distance of approximately 3 mm from front endwall 236 of the recess 230.

Figure 6:
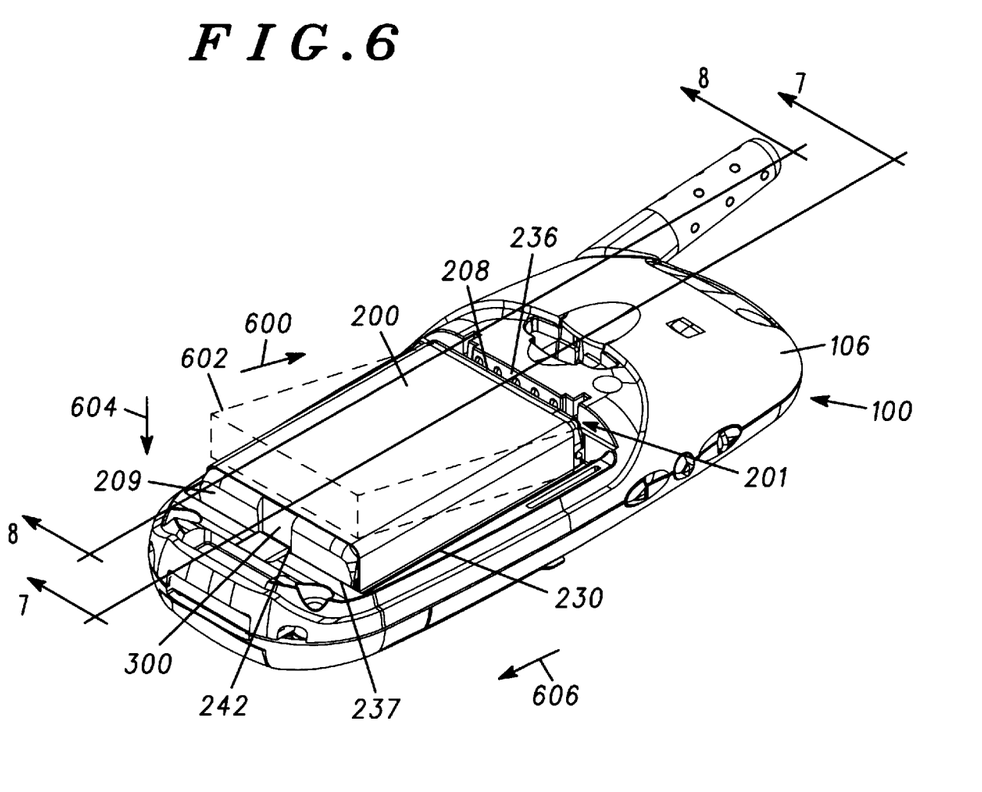
FIG. 6 is the rear, left side, and bottom perspective view of the electronic device of FIG. 2 showing the battery attached via the battery attachment apparatus.

The battery 200 is assembled to the bottom housing portion 106 via the battery attachment apparatus 201, as shown in FIG. 6. The battery 200 is oriented at a slight angle, such as 15 degrees, with respect to base surface 234 of FIG. 3 of the recess 230 and positioned in the recess 230 such that the top edge of front end 208 of the battery 200 abuts the top of front endwall 236 of the recess 230, as depicted by arrow 600 of FIG. 6 and the broken line showing 602 of the battery 200. Upon abutment of the front end 208 and front endwall 236, notches 214 and 215 of FIG. 2 of the battery 200 receive catches 304 and 305 of the recess 230, respectively, and the flat contacts 218–222 mate with, and deflect, the spring contacts 308–312 of FIG. 3 of the recess 230, respectively. The spring contacts 308–312 are deflected back into openings 318–322 of front endwall 236, respectively, by the flat contacts 218–222 to an engaging position. In the illustrated embodiment, the spring contacts 308–312 are in the engaging position when each extends a distance of approximately 1 mm from front endwall 236 of the recess 230.

Once in the engaging position, assembly is completed by moving rear end 209 of the battery 200 towards the recess 230, as depicted by arrow 604, and in abutment with rear endwall 237 of the recess 230 until notch 300 of the battery 200 is aligned with catch 242 of the recess 230 and bottom face surface 207 of FIG. 3 of the battery 200 is juxtaposed with base surface 234 of the recess 230. Once aligned, the battery 200 is released allowing the spring contacts 308–312 to extend and urge the battery 200 in the direction of arrow 606 of FIG. 6. The spring contacts 308–312 urge the battery 200 until catch 242 is received in notch 300 and until the spring contacts 308–312 have extended to an engaged position, as shown in FIG. 7 with respect to spring contact 310. In the illustrated embodiment, the spring contacts 308–312 are in the engaged position when each extends a distance of approximately 2 mm from front endwall 236 of the recess 230.

Figure 8:
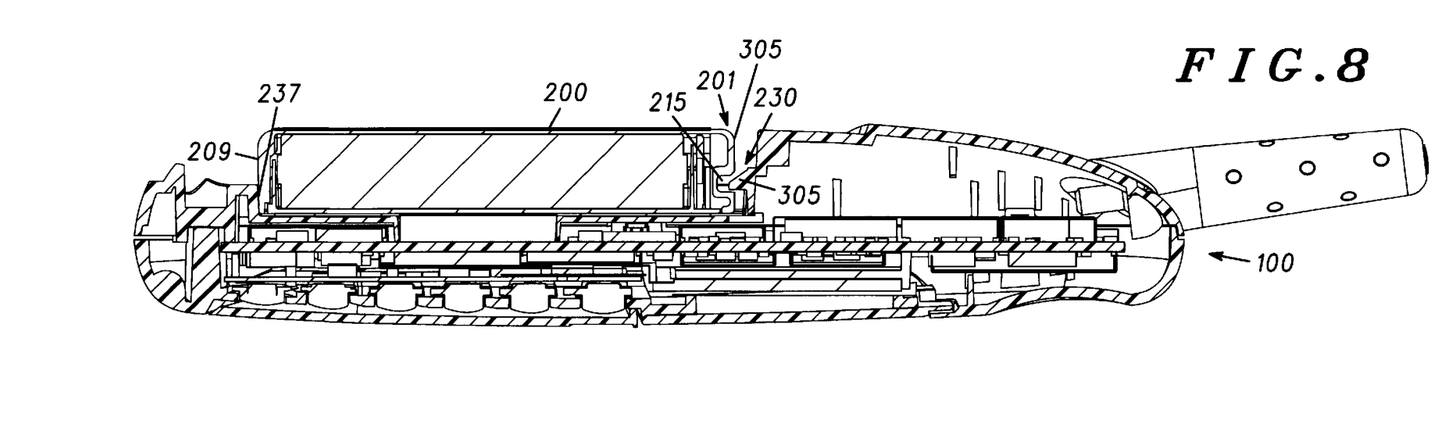
FIG. 8 is a second cross-sectional view of the electronic device of FIG. 6 taken across section lines 8—8 in FIG. 6.

Once in the engaged position, the spring contacts 308–312 electrically connect and physically secure the battery 200 to the electronic device 100. As shown in FIG. 7, spring contact 310 electrically connects flat contact 220, which is coupled to the electrochemical cell 700 of the battery 200, to a transceiver board 702 positioned in the electronic device 100. The transceiver board 702 is populated with electronic radio circuitry 704, which operates from power provided by the cell 700. In the engaged position, the spring contacts 308–312, collectively, exert about 2.5–3 N of force on the battery 200. This amount of force is sufficient to keep catch 242 fully inserted into notch 300 and rear end 209 in abutment with rear endwall 237, as shown in FIG. 7. Because catches 304 and 305 and notches 214 and 215 are different in length and depth with respect to catch 242 and notch 300, catches 304 and 305 of the recess 230 remain partially received in notches 214 and 215 of the battery 200, as exemplified in FIG. 8 with respect to notch 215 and catch 305. As a result, bottom face surface 207 of the battery 200 is locked into juxtaposition with base surface 234 of the recess 230 and the battery 200 is prevented from moving out of the recess 230. Thus, by employing a fixed latch arrangement with variably sized catches and notches and a contact arrangement that provides both electrical connectivity and spring force, the battery cover 118 is not needed to secure the battery 200 to the electronic device 100.

Although shown in FIGS. 2 and 3 to be carried on the battery 200 to minimize the opportunity for breakage in the event that the battery 200 is dropped, any of the notches 214, 215, and 300 and the flat contacts 218–222 of the battery attachment apparatus 201 could alternately be carried in the recess 230. For example, in one alternate embodiment, the notches 214, 215, and 300 on the battery 200 are replaced with the catches 304, 305, and 242, respectively, and the catches 304, 305, and 242 in the recess 230 are replaced with the notches 214, 215, and 300, respectively. In a second alternate embodiment, the flat contacts 218–222 of the battery 200 are replaced with the spring contacts 308–312, respectively, and the spring contacts 308–312 of the recess 230 are replaced with the flat contacts 218–222, respectively. Attachment of the battery 200 to the recess 230 via one of these alternate embodiments of the battery attachment apparatus 201 is performed substantially as described above with respect to FIG. 6.

The battery 200 is disassembled from the recess 230 by substantially reversing the steps previously described with respect to assembly, shown in FIG. 6. First, the battery 200 is pushed in the direction opposite to arrow 606 until catch 242 clears notch 300 and the spring contacts 308–312 are deflected to a disengaging position. In the illustrated embodiment, the disengaging position is substantially similar to the engaging position. Next, while in the disengaging position, the rear end 209 of the battery 200 is swung in the direction opposite to arrow 604 until rear end 209 clears rear endwall 237 of the recess 230. Once clear, the battery 200 may be lifted away from the recess 230 and the bottom housing portion 106.

While particular embodiments have been shown and described, modifications may be made. For example, the spring contacts 308–312 could employ a different spring geometry, such as helical. The flat contacts 218–222 could alternatively be replaced with a second set of spring contacts that deflectably mate with the spring contacts 308–312. Also, through slight variations in spring contact geometry, more or fewer than five of the spring contacts 308–312 may be employed to provide the force necessary to secure the battery 200. The flat and spring contacts 218–222 and 308–312 could be moved to permit a single, centrally positioned notch-catch combination in place of notches 214 and 215 and catches 304 and 305. Although shown to be incorporated into a wireless communication device such as a radiotelephone, it will be recognized that the battery attachment apparatus 201 may also be beneficially used in pagers, laptop computers, personal digital assistants, landline telephones, cordless telephones, two-way radios, portable cassette recorders and players, universal or backup power supplies, and the like. It is therefore intended in the appended claims to cover all such changes and modifications which fall within the true spirit and scope of the invention.

What is claimed is:

1. A battery attachment apparatus comprising:
   a housing having at least one electrochemical cell positioned therein, the housing having first and second opposing ends;
   a plurality of contacts carried on the housing; and
   a latching arrangement carried on the housing separate from the plurality of contacts, the latching arrangement to removably secure the housing to a second housing using only fixed non-movable latching members, the fixed non-movable latching members of the latching arrangement comprising:
   a first mating notch formed in the first end, the first mating notch having a first depth; and
   a second mating notch formed in the second end, the second mating notch having a second depth different from the first depth.

2. A battery attachment apparatus according to claim 1 wherein the fixed non-movable latching members of the latching arrangement further comprise a third mating notch formed in the second end, the third mating notch having a third depth different from the first depth.

3. A battery attachment apparatus according to claim 1 further comprising a plurality of openings formed in the second end of the first housing, and
   wherein each one of the plurality of contacts is a flat contact, each one of the plurality of contacts recessed in corresponding ones of the plurality of openings.

4. A battery attachment apparatus according to claim 1 wherein
   the housing further comprises a face surface extending between the first and second opposing ends, and
   the first mating notch intersects an edge where the face surface joins the first end.

5. A battery attachment apparatus according to claim 2 wherein
   the housing has a substantially rectangular solid shape defined by a longitudinal axis and a transverse axis, and
   each of the second and third mating notches is defined by a generally rectangular opening that extends longitudinally in a plane parallel to the transverse axis.

6. A battery attachment apparatus according to claim 2 wherein
   the housing further comprises first and second side surfaces, the first and second side surfaces perpendicularly interconnecting the first and second ends, the first side surface joining the second end at a first edge, and the second side surface joining the second end at a second edge,
   the second mating notch is located between a center of the second end and the first edge, and
   the third mating notch is located between the center of the second end and the second edge.

7. A battery attachment apparatus according to claim 2 wherein
   the housing further comprises first and second side surfaces, the first and second side surfaces perpendicularly interconnecting the first and second ends,
   the second mating notch intersects an edge where the first side surface joins the second end,
   the third mating notch intersects an edge where the second side surface joins the second end, and
   the plurality of contacts are located on the second end between the second and third mating notches.

8. A battery attachment apparatus according to claim 1 wherein
   the housing further comprises first and second side surfaces, the first and second side surfaces perpendicularly interconnecting the first and second ends, and
   the first mating notch is located at a center of the first end equidistant the first and second side surfaces.

9. A battery attachment apparatus according to claim 1 wherein the second depth is at least twice as large as the first depth.

10. A battery attachment apparatus according to claim 1 wherein
    the housing further comprises a face surface extending between the first and second ends, and
    the plurality of contacts are located at an edge where the face surface joins the second end, each of the plurality of contacts is "L"-shaped to extend along the second end and the face surface.

11. A battery attachment apparatus according to claim 1 further comprising:
    the second housing, the second housing having electronic circuitry positioned therein, the second housing having a recess, the recess enclosed by first and second opposing endwalls and first and second opposing sidewalls extending between the first and second endwalls;
    a second plurality of contacts carried in the recess, the second plurality of contacts to mate with the plurality of contacts; and
    a second latching arrangement carried in the recess, the second latching arrangement to mate with the latching arrangement, the second latching arrangement comprising:
    a first catch carried on the first endwall, the first catch for insertion into the first mating notch; and
    a second catch carried on the second endwall, the second catch for insertion into the second mating notch.

12. A battery attachment apparatus according to claim 11 wherein
    the first catch has a first length, and
    the second catch has a second length, the second length at least twice as large as the first length.

13. A battery attachment apparatus according to claim 11 wherein
    each of the plurality of contacts is a non-movable flat contact electrically connected to the at least one electrochemical cell, and
    each of the second plurality of contacts is a deflectable spring contact electrically connected to the electronic circuitry, the second plurality of contacts to facilitate mating of the second latching arrangement and the latching arrangement, and the second plurality of contacts to deliver battery power from the at least one electrochemical cell to the electronic circuitry.

14. A battery attachment apparatus for attaching a battery to an electronic device, the battery attachment apparatus comprising:

a latching arrangement carried on the electronic device and the battery to removably secure the battery to the electronic device using only fixed non-movable latching members, and a contact arrangement carried on the electronic device and the battery, the contact arrangement separate from the latching arrangement, the contact arrangement comprising a first plurality of contacts and a second plurality of contacts, one of the first and second pluralities of contacts carried on the battery, the other one of the first and second pluralities of contacts carried on the electronic device, the contact arrangement to apply a spring force to facilitate engagement of the fixed non-movable latching members of the latching arrangement and physically attach the battery to the electronic device, and the contact arrangement to mate the first and second pluralities of contacts to facilitate an electrical connection and electrically connect the battery to the electronic device.

15. A battery attachment apparatus according to claim 14 wherein the fixed non-movable latching members of the latching arrangement comprise first and second catches and first and second notches, the first catch having a first length, the second catch having a second length greater than the first length, the first notch having a first depth, the second notch having a second depth greater than the first depth.

16. A battery attachment apparatus according to claim 15 wherein, upon engagement of the fixed non-movable latching members of the latching arrangement, the first catch is received in the first notch and the second catch is partially received in the second notch.

17. A battery attachment apparatus according to claim 16 wherein an amount of the second catch received in the second notch is approximately equal to the first length.

18. A battery attachment apparatus according to claim 15 wherein the electronic device has first and second opposing endwalls, the battery has first and second opposing ends, the first and second pluralities of contacts are carried between the first end and the first endwall, each of the first plurality of contacts is a flat contact, and each of the second plurality of contacts is a spring contact, the second plurality of contacts deflectable by the first plurality of contacts to a fourth length during attachment of the battery to the electronic device, the fourth length less than the second length.

19. A battery attachment apparatus according to claim 18 wherein the first and second endwalls are spaced apart a first distance, the first distance less than a sum of a distance between the first and second ends of the battery and the fourth length.

20. A battery attachment apparatus according to claim 18 wherein the second plurality of contacts are deflectable by the first plurality of contacts to a fifth length upon securing the battery to the electronic device, the fifth length greater than the fourth length and less than the second length.

21. A battery attachment apparatus according to claim 20 wherein the first and second endwalls are spaced apart a first distance, the first distance approximately equal to a sum of a distance between the first and second ends of the battery and the fifth length.

22. A battery attachment apparatus according to claim 14 wherein each of the second plurality of contacts comprises:

a central body, a contact spring arm having a substantially curved "J"-shaped segment extending from one end of the central body and a substantially folded "<"-shaped segment extending from the "J"-shaped segment, and a lead spring arm having a first slanting segment extending substantially perpendicular from the other end of the central body and a second slanting segment extending slightly less than perpendicular from the first slanting segment.

23. A battery attachment apparatus according to claim 22 wherein the contact spring arm is deflectable in a first direction, and the lead spring arm is deflectable in a second direction different from the first direction.

24. A battery attachment apparatus according to claim 22 further comprising a detachable contact block, and wherein the central body comprises a locking tooth to secure each of the second plurality of contacts in the contact block.

25. A battery-powered electronic device comprising:

a battery comprising:

a battery housing having at least one electrochemical cell disposed therein, the battery pack comprising first and second ends, first and second side surfaces extending between the first and second ends, and first and second face surfaces extending between the first and second ends and the first and second side surfaces, the second end joining the first side surface at a first edge, and the second end joining the second side surface at a second edge, a first notch formed in a center of the first end equidistant the first and second side surfaces, a second notch formed in the second end at the first edge, a third notch formed in the second end at the second edge, a plurality of flat contacts carried on the second end, the plurality of flat contacts located between the second and third notches, the plurality of contacts electrically connected to the at least one electrochemical cell; and an electronic device comprising:

a device housing having electronic circuitry positioned therein and a recess, the recess bounded by first and second endwalls, first and second sidewalls extending between the first and second endwalls, and a base surface extending between the first and second endwalls and the first and second sidewalls, a first catch carried on a center of the first endwall equidistant the first and second sidewalls, the first catch for insertion into the first notch, a second catch carried on the second endwall, the second catch located between a center of the second endwall and the first sidewall, the second catch for insertion into the second notch, a third catch carried on the second endwall, the third catch located between the center of the second endwall and the second sidewall, the third catch for insertion into the third notch, and a plurality of spring contacts carried on the second endwall, the plurality of spring contacts located between the second and third catches directly opposite the first catch, the plurality of spring contacts electrically connected to the electronic circuitry, the plurality of spring contacts adapted to mate with corresponding ones of the plurality of flat contacts to electrically connect the electronic circuitry to the at least one electrochemical cell, and the plurality of spring contacts further adapted to push the battery into abutment with the first endwall of the recess and obtain insertion of the first catch into the first notch and partial insertion of the second and third catches into the second and third notches to physically attach the battery to the electronic device.

* * * * *